(12) United States Patent
Rickards

(10) Patent No.: US 8,744,113 B1
(45) Date of Patent: Jun. 3, 2014

(54) COMMUNICATION EYEWEAR ASSEMBLY WITH ZONE OF SAFETY CAPABILITY

(71) Applicant: Tom Rickards, St. Augustine, FL (US)

(72) Inventor: Tom Rickards, St. Augustine, FL (US)

(73) Assignee: Energy Telecom, Inc., St. Augustine, FL (US)

( * ) Notice: Subject to any disclaimer, the term of this patent is extended or adjusted under 35 U.S.C. 154(b) by 0 days.

(21) Appl. No.: 13/713,789

(22) Filed: Dec. 13, 2012

(51) Int. Cl.
*H04R 25/00* (2006.01)
*H04R 1/10* (2006.01)
*H04R 1/02* (2006.01)
*G02C 11/06* (2006.01)
*H04M 1/06* (2006.01)

(52) U.S. Cl.
CPC ............... *H04R 1/105* (2013.01); *H04R 1/025* (2013.01); *G02C 11/06* (2013.01); *H04M 1/06* (2013.01)
USPC ........... 381/381; 381/375; 381/327; 379/430; 455/575.2

(58) Field of Classification Search
CPC ........ G02C 11/06; H04R 1/025; H04R 1/105; H04R 2410/05; H04M 1/05; H04M 1/06
USPC ........ 381/327, 375, 381; 379/430; 455/556.1, 455/569.1, 575.2; 351/158
See application file for complete search history.

(56) References Cited

U.S. PATENT DOCUMENTS

| | | |
|---|---|---|
| 3,169,600 A | 2/1965 | Thomas |
| 3,610,841 A | 10/1971 | Hutchings |
| 3,787,643 A | 1/1974 | Nielsen |
| 3,807,526 A | 4/1974 | Sygnator |
| 3,825,700 A | 7/1974 | Jerry et al. |
| 3,943,925 A | 3/1976 | Leight |
| 3,946,168 A | 3/1976 | Preves |
| 4,353,364 A | 10/1982 | Woods |
| 4,683,587 A | 7/1987 | Silverman |
| 4,819,270 A | 4/1989 | Lombardo |

(Continued)

FOREIGN PATENT DOCUMENTS

| | | |
|---|---|---|
| AU | 759466 | 7/2003 |
| CA | 2215734 | 5/1998 |

(Continued)

OTHER PUBLICATIONS http://www.dailymail.co.uk/sciencetech/article-2081702/Sony-releases-television-shows-person-sofa-totally-different-screen.html dated Jan. 3, 2012.

(Continued)

*Primary Examiner* — Tuan D Nguyen
(74) *Attorney, Agent, or Firm* — Malloy & Malloy, P.L.

(57) ABSTRACT

A communication eyewear assembly is configured to identify a zone of safety about a wearer and to notify the wearer and/or others of same. A frame assembly is worn to maintain at least one transparent eye panel in front of the wearer's eyes. A processor coupled to the frame assembly receives incoming data from at least one data source. Utilizing the received data, the processor generates zone of safety information in least one spatial dimension relative to a hazardous area. The assembly can also determine existence of extraordinary circumstances based on changes or lack of changes in the data, and notify the wearer and/or others of same, particularly with regard to the status of the wearer. In accordance with the monitoring of the wearer and/or the communication eyewear itself, a unique ID is assigned to the communication eyewear assembly.

32 Claims, 8 Drawing Sheets

(56) References Cited

U.S. PATENT DOCUMENTS

| | | |
|---|---|---|
| 4,972,491 A | 11/1990 | Wilcox, Jr. |
| 5,002,151 A | 3/1991 | Oliveira et al. |
| 5,020,150 A | 5/1991 | Shannon |
| 5,029,216 A | 7/1991 | Jhabvala et al. |
| 5,265,165 A | 11/1993 | Rauch |
| 5,298,692 A | 3/1994 | Ikeda et al. |
| 5,335,285 A | 8/1994 | Gluz |
| 5,367,345 A | 11/1994 | Da Silva |
| 5,396,563 A | 3/1995 | Yoshimi |
| 5,475,449 A | 12/1995 | Pyle |
| 5,541,677 A | 7/1996 | Huhtala |
| 5,606,743 A | 2/1997 | Vogt et al. |
| 5,703,670 A | 12/1997 | Callard |
| 5,715,337 A | 2/1998 | Spitzer et al. |
| 5,717,479 A | 2/1998 | Rickards |
| 5,737,436 A | 4/1998 | Boyden |
| 5,886,822 A | 3/1999 | Spitzer |
| 5,988,812 A | 11/1999 | Wingate |
| 6,005,536 A | 12/1999 | Beadles et al. |
| 6,010,216 A | 1/2000 | Jesiek |
| 6,012,812 A | 1/2000 | Rickards |
| 6,085,428 A | 7/2000 | Casby et al. |
| 6,091,546 A | 7/2000 | Spitzer |
| 6,091,832 A | 7/2000 | Shurman et al. |
| 6,176,576 B1 | 1/2001 | Green et al. |
| 6,204,974 B1 | 3/2001 | Spitzer |
| 6,233,345 B1 | 5/2001 | Urwyler |
| 6,353,503 B1 | 3/2002 | Spitzer et al. |
| 6,384,982 B1 | 5/2002 | Spitzer |
| 6,629,076 B1 | 9/2003 | Haken |
| 6,729,726 B2 | 5/2004 | Miller et al. |
| 6,769,767 B2 | 8/2004 | Swab et al. |
| 6,850,166 B2 | 2/2005 | Deeds |
| 6,879,443 B2 | 4/2005 | Spitzer et al. |
| 6,929,365 B2 | 8/2005 | Swab et al. |
| 6,950,531 B2 | 9/2005 | Rickards |
| 6,966,647 B2 | 11/2005 | Jannard et al. |
| 7,004,582 B2 | 2/2006 | Jannard et al. |
| 7,013,009 B2 | 3/2006 | Warren |
| 7,079,876 B2 | 7/2006 | Levy |
| 7,131,058 B1 | 10/2006 | Lapstun et al. |
| 7,133,532 B2 | 11/2006 | Rickards |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,231,038 B2 | 6/2007 | Warren |
| 7,313,246 B2 * | 12/2007 | Miller et al. ............... 381/381 |
| 7,328,048 B2 | 2/2008 | Levy |
| 7,430,300 B2 | 9/2008 | Vosburgh et al. |
| 7,512,414 B2 | 3/2009 | Jannard et al. |
| 7,869,768 B1 | 1/2011 | Vishlitzky |
| 8,243,973 B2 | 8/2012 | Rickards et al. |
| 2005/0096096 A1 | 5/2005 | Birli et al. |
| 2006/0052146 A1 | 3/2006 | Ou |
| 2006/0153409 A1 | 7/2006 | Yeh |
| 2007/0049363 A1 * | 3/2007 | Green et al. ............... 455/575.2 |
| 2007/0116318 A1 | 5/2007 | Rickards |
| 2008/0298578 A1 | 12/2008 | Regen et al. |
| 2009/0034775 A1 | 2/2009 | Burton |
| 2010/0061579 A1 * | 3/2010 | Rickards et al. ............... 381/375 |
| 2012/0147043 A1 | 6/2012 | Asukai et al. |
| 2012/0235886 A1 | 9/2012 | Border et al. |
| 2012/0293548 A1 | 11/2012 | Perez et al. |

FOREIGN PATENT DOCUMENTS

| | | |
|---|---|---|
| CN | 91224600.6 | 7/1992 |
| CN | 98814067.5 | 7/2004 |
| EP | 1060433 | 11/2009 |
| EP | 1584216 | 1/2010 |
| IT | 96A000156 | 8/1996 |
| JP | H025-093152 U | 12/1993 |
| JP | H10-304030 A | 11/1998 |
| JP | 2002-027072 A | 1/2002 |
| JP | 2007-174612 A | 7/2007 |
| JP | 3149350 U | 3/2009 |
| JP | 2013522953 | 6/2013 |
| WO | WO94/14152 | 6/1994 |
| WO | WO98/07062 | 2/1998 |
| WO | WO99/27413 | 6/1999 |
| WO | WO 2010/019634 A | 2/2010 |
| WO | WO2011/112165 | 9/2011 |

OTHER PUBLICATIONS http://www.vg247.com/2010/07/20/sony-patents-3d-multiplayer-system-without-split-screen/ dated Jul. 20, 2010.

http://www.dailymail.co.uk/sciencetech/article-2097879/Google-glasses-sale-end-2012-cost-250.html dated Feb. 22, 2012.

http://www.engadget.com/2012/05/15/google-glasses-design-patent/ dated May 15, 2012.

http://www.dailymail.co.uk/sciencetech/article-2170864/Olympus-takes-Apple-Google-glasses-brighten-real-world.html dated Jul. 9, 2012.

* cited by examiner

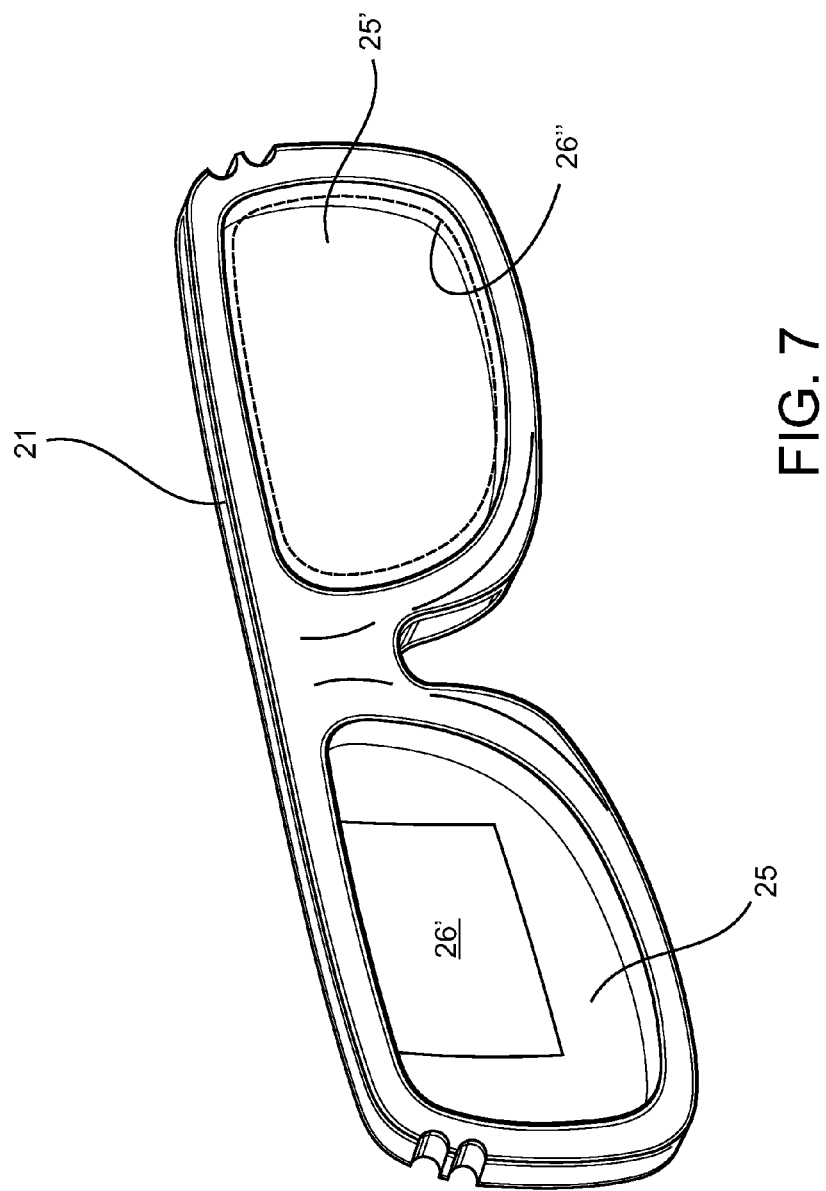

COMMUNICATION EYEWEAR ASSEMBLY WITH ZONE OF SAFETY CAPABILITY

BACKGROUND OF THE INVENTION

1. Field of the Invention

The present invention is directed to a communication eyewear assembly that is structured be worn on a person's head so as to protect the person's eyes and also to permit hands-free wireless multimedia communication. The communication eyewear assembly is additionally structured to identify a zone of safety about the wearer and to notify the wearer and/or others of the zone of safety. Moreover, the assembly can process a variety of data, receivable from a variety of sources, to ascertain and/or identify the zone of safety. The assembly can also determine existence of extraordinary circumstances based on changes or lack of changes in the data, and notify the wearer and/or others of same, particularly with regard to the status of the wearer.

2. Description of the Related Art

The use of eyewear, particularly protective eyewear, such as sunglasses, sports eyewear, or safety glasses, has achieved near universal adoption by modern society. So too has the use of various types of communication devices, such as radios, portable music players, smart phones, tablets, etc. More recently, attempts have been made to combine certain features of each of these types of equipment to address the needs of persons who require both eye protection and audiovisual communicability, such as people working in industrial, mining, construction, or military settings. Indeed, some such technology has begun to expand into entertainment and leisure applications such as sports and interactive gaming. However, despite some progress in the art, current technologies have failed to address many significant challenges.

One problem with current devices is that they do not adequately combine audio, visual, and communicative features into a single, integrated device, particularly one that provides quality in-ear audio in a noisy environment. In some cases, such as those involving the fledgling technology of "augmented reality" eyewear, existing devices might typically include a visual display and remote communication features, but lack any audio capabilities. In other cases, such devices might focus primarily on audio communications. Indeed, some existing telecommunication eyewear might provide only rudimentary visual information such as a street name, a retail store location, etc., or perhaps even lack a visual display altogether. Another common drawback involves the typical speaker functionality which is not adequately structured to deliver quality sound to the wearer, especially in noisy environments. Accordingly, there is a need to provide a communication eyewear assembly that is structured to permit hands-free wireless multimedia communication and which overcomes these shortcomings to combine audio, visual, and communicative features into a single, integrated device, particularly one that provides quality in-ear audio in a noisy environment.

Another problem with current head-worn devices is that they lack adequate measures for dealing with the effects of operating in potentially hazardous environments, in that they are not sufficiently structured to distinguish ordinary, safe environments or situations from hazardous ones. For instance, when a person is operating in a hazardous environment that requires use of telecommunication eyewear, it can be critical for the person to have the ability to discern a safe situation from a dangerous one. Presently, this is left to either the wearer's own instincts and observations, or perhaps a combination of those plus observations from remote observers who are in radio contact with the wearer. It would therefore be advantageous to overcome these limitations by providing for a communication eyewear assembly that is structured to identify a zone of safety about the wearer and to notify the wearer and/or others of the zone of safety, as distinguished from hazardous zones. It would be a further benefit for such an assembly to have the capability of processing a variety of data, receivable from a variety of sources, to ascertain and/or identify the zone of safety.

Further still, human beings operating in dangerous environments are susceptible to numerous dangers which can lead to immobility, injury, incapacity, or other sudden changes in status. Moreover, the general status of such environments can change rapidly, potentially affecting the wearer of communications equipment and/or other people or things in the vicinity. As such, it would also be beneficial to provide for a communication eyewear assembly that can determine the existence of extraordinary circumstances based on changes or lack of changes in observed data, and notify the wearer and/or others of same, particularly with regard to the identity, condition, location or other status of the wearer.

SUMMARY OF THE INVENTION

The present invention is directed to a communication eyewear assembly that is structured be worn on a person's head so as to protect the person's eyes and also to permit hands-free wireless multimedia communication. The communication eyewear assembly is additionally structured to identify a zone of safety about the wearer and to notify the wearer and/or others of the zone of safety. Moreover, the assembly can process a variety of data, receivable from a variety of sources, to ascertain and/or identify the zone of safety. The assembly can also determine existence of extraordinary circumstances based on changes or lack of changes in the data, and notify the wearer and/or others of same, particularly with regard to the status of the wearer.

In at least one embodiment, the communication eyewear assembly comprises a frame assembly which is structured to be worn on a person's head. Accordingly, the frame assembly is structured to be supportably disposed on the wearer so as to maintain at least one substantially transparent eye panel in a generally shielding position in front of the wearer's eyes. In one such embodiment, the frame assembly comprises a front frame member and two eye panels coupled thereto. In a further embodiment, the frame assembly additionally comprises a pair of legs structured to effectively retain and position the front frame member in front of the wearer's eyes.

The communication eyewear assembly provides for wireless communication between the wearer and other entities, such as, but not limited to, other wearers, control stations, broadcast stations, network servers, remote network peers, local and/or remote data sources, etc. By way of example, the wireless communication could involve a wearer located on a factory floor communicating with a manager located in a control station. As another example, the wireless communication could involve a wearer participating in an investigation of a hazardous event while in contact with an emergency response vehicle and/or a related dispatch center. As yet another example, the wireless communication could involve a wearer participating in an interactive sport or game together with a plurality of other participants in real time and/or space. These examples are meant for illustrative purposes only, as the present invention can apply to a variety of other applications and circumstances.

Accordingly, the communication eyewear assembly comprises at least one processor which is coupled to the frame assembly. The processor is structured and disposed to receive an incoming data signal, typically from a remote location, which can include, but is not limited to, audio, video, real-time voice data, environmental data, locational data, data on other objects or persons, etc.

The processor is further structured and disposed to transmit an outbound data signal to another entity, such as, but not limited to, real-time voice data from the wearer to another person with whom the wearer is communicating. Further details of the multimedia communication capabilities of the processor, including incoming and outbound visual signals, environmental, and locational data, etc., are discussed in more detail below, particularly with regard to the zone of safety capability.

The communication eyewear assembly additionally comprises at least one earpiece structured to be disposed in communication with the processor and further structured to be disposed at one of the wearer's ears. As such, the processor retransmits the received incoming audio signal to at least one earpiece, which in turn communicates the incoming audio signal to the wearer via a speaker assembly. In a further embodiment, the communication eyewear assembly comprises two earpieces, each of which is structured to be disposed at a different one of the wearer's ears. In a still further embodiment, the earpieces are additionally structured to substantially muffle ambient noise, further facilitating communication. In yet another embodiment, the earpieces are structured to be removably secured to the frame assembly for storage.

The communication eyewear assembly additionally comprises a camera assembly disposed and structured to pick up an outbound visual signal, which may comprise image data and/or video data. Because the assembly is worn on a wearer's head, the outbound visual signal will typically reflect the view as seen from the wearer's perspective, although other views may also be captured including, but not limited to, views directed behind the wearer. As with the other aforementioned multimedia components, the camera assembly is further structured to transmit the outbound visual signal to the processor. Accordingly, the processor is structured to transmit to another entity the outbound visual signal received from the camera assembly.

The processor is also structured to receive an incoming visual signal from a remote location. For instance, the incoming visual signal may comprise image data and/or video data, such as pictures or movies from a remotely stored and transmitted data file. As such, the communication eyewear assembly further comprises a display assembly disposed and structured to display the incoming visual signal received by the processor. More specifically, the display assembly includes at least one display unit disposed and structured to display the incoming visual signal to the wearer.

As indicated, above, the communication eyewear assembly is additionally structured to identify a zone of safety about the wearer and to notify the wearer and/or others of the zone of safety. In particular, the processor is structured to receive, send, and process a variety of data associated with ascertaining and/or identifying the zone of safety. This includes multimedia communication capabilities associated various sources and recipients of information, preferably via a wireless communication system.

Accordingly, the processor can communicate with remote data sources such as a remote environmental data source or a remote locational data source. Environmental data can include general as well as specific information about the environment around the eyewear wearer, such as dangerous temperatures, toxic gases, airborne chemical or biological agents, ionizing radiation, potentially damaging energy fields, atmospheric pressure, etc. Locational data can include information about the location or orientation of the wearer and/or other items of interest.

The processor can also communicate with local data sources such as a local environmental data source or a local locational data source generally situated in the vicinity of the area in which the wearer is operating. The environmental and locational data provided by the local sources can comprise similar types of information to that provided by the remote data sources as well as additional stored and/or real-time information based on direct local measurements, observations, inputs, etc.

The processor can also communicate with data sources worn by the wearer such as a personal environmental data source, a personal locational data source, or a biometric data source, which may be embedded in the wearer's clothing or attached thereto, such as via arm band, leg band, belt, backpack, etc.

The processor can also communicate with personal data sources worn by individuals other than the wearer, particularly those in proximity to the wearer. Information obtained and provided by such data sources can comprise similar types of information to that provided by the remote data sources, the local data sources, and the wearer's personal data sources.

In addition, the communication eyewear assembly, itself, can include similar types of data sources integrated therewith, such as, but not limited to, environmental sensors, locational sensors, and/or biometric sensors indicating wearer's physical status.

The above-described data can be utilized to compare the wearer's present physical status with predetermined criteria and to notify the wearer and/or others of the wearer's physical status.

The above-described data can also be processed by the processor and/or a remote processor to identify a zone of safety about the wearer. The processors can provide a wide variety of associated functionality, such as in some cases identifying a predetermined zone of safety based on observed parameters, or in other cases, calculating a zone of safety based on pre-existing data received. The zone of safety can be determined for one, two, or three dimensions, as well as comprise a temporal aspect, such as in the case of a dynamic, changing situation.

Once the processor and/or remote processor determine the zone of safety, the communication eyewear assembly is capable of notifying the wearer of same, such as by displaying hazardous conditions information through a visual display, by communicating a pre-determined audio spoken message or tone to the eyewear's audio earpieces, or by vibrational means, electrical shock, heat, etc.

Similarly, other individuals in the vicinity can receive appropriate zone of safety notification on their personal communication device, as can the wearer if he/she is wearing a separate personal communication device. Moreover, remote locations such as control stations, dispatch stations, etc., can receive the zone of safety notification and process the associated information accordingly.

In accordance with the monitoring of the wearer and/or the communication eyewear worn by the wearer, the present invention can further involve the assignment of a unique ID to the wearer's communication eyewear assembly. Further, the unique ID can be transmitted to a remote location or as part of normal wireless transmissions to the wearer's personal communication device for purposes of confirming the identity of the wearer, and times of use. The unique ID can be contained in the processor and/or the locational sensors, either alone or in combination with processor, or by separate means such as those involving local RFID, for purposes of establishing location and movement from point to point.

In a further embodiment, the communication eyewear assembly is structured to determine existence of extraordinary circumstances based on changes or lack of changes in the data, and to notify the wearer and/or others of same. Relevant data can comprise biometric or other data of the individual wearer and/or that of the environment surrounding the wearer, and can be utilized to assess the well-being of the wearer and to optionally notify remote locations of the wearer's health status, possible distress, etc.

In a still further embodiment, the communication eyewear assembly may comprise a user interface, such as a touch sensitive interface, brain wave monitor, motion sensor, optical recognition monitor, etc. The user interface is disposed in communication with the processor and is structured to relay received input to the processor so as to permit selective control of at least one type of input parameter that can be received and processed by the processor. By way of further example, the wearer can interact with various embodiments of the user interface by touching it (e.g., swiping, tapping, touching and holding), using forehead movement, nose movement, ear movement, eye movement, eyelid movement, or in some cases by simply thinking, etc., as well as ay combinations thereof. For instance, in one embodiment, the user interface can be structured to facilitate selection or control of the visual display of incoming data. In another embodiment, the user interface can be structured to facilitate control of audio volume. In still another embodiment, the user interface can be structured to facilitate input of an emergency distress signal, such as a pattern of successive taps, etc.

As an additional control interface feature, the processor can be structured to process audio instructions received directly from the wearer via the microphone, such as for manipulation and adjustment of display and/or audio settings, or to initiate a distress signal.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 7 is a partial perspective view of a communication eyewear assembly having a display assembly which includes two different types of display units.

Like reference numerals refer to like parts throughout the several views of the drawings.

DETAILED DESCRIPTION OF THE PREFERRED EMBODIMENT

As shown throughout the accompanying figures, the present invention is directed towards a communication eyewear assembly generally indicated as 10.

The communication eyewear assembly 10 is structured to be worn on a person's head so as to protect the person's eyes and also to permit hands-free wireless multimedia communication. The communication eyewear assembly 10 is additionally structured to identify a zone of safety about the wearer, as distinguished from a hazardous object or zone, and to notify the wearer and/or others of the zone of safety, such as that of an industrial environment, or that found in a variety of other situations, such as, but not limited to, military operations, fire and rescue operations, public safety operations, sports activities, interactive gaming, etc. Moreover, the assembly 10 can process a variety of data, receivable from a variety of sources, to ascertain and/or identify the zone of safety. The assembly 10 can also determine existence of extraordinary circumstances based on changes or lack of changes in the data, and notify the wearer and/or others of same, particularly with regard to the status of the wearer.

Figure 1:
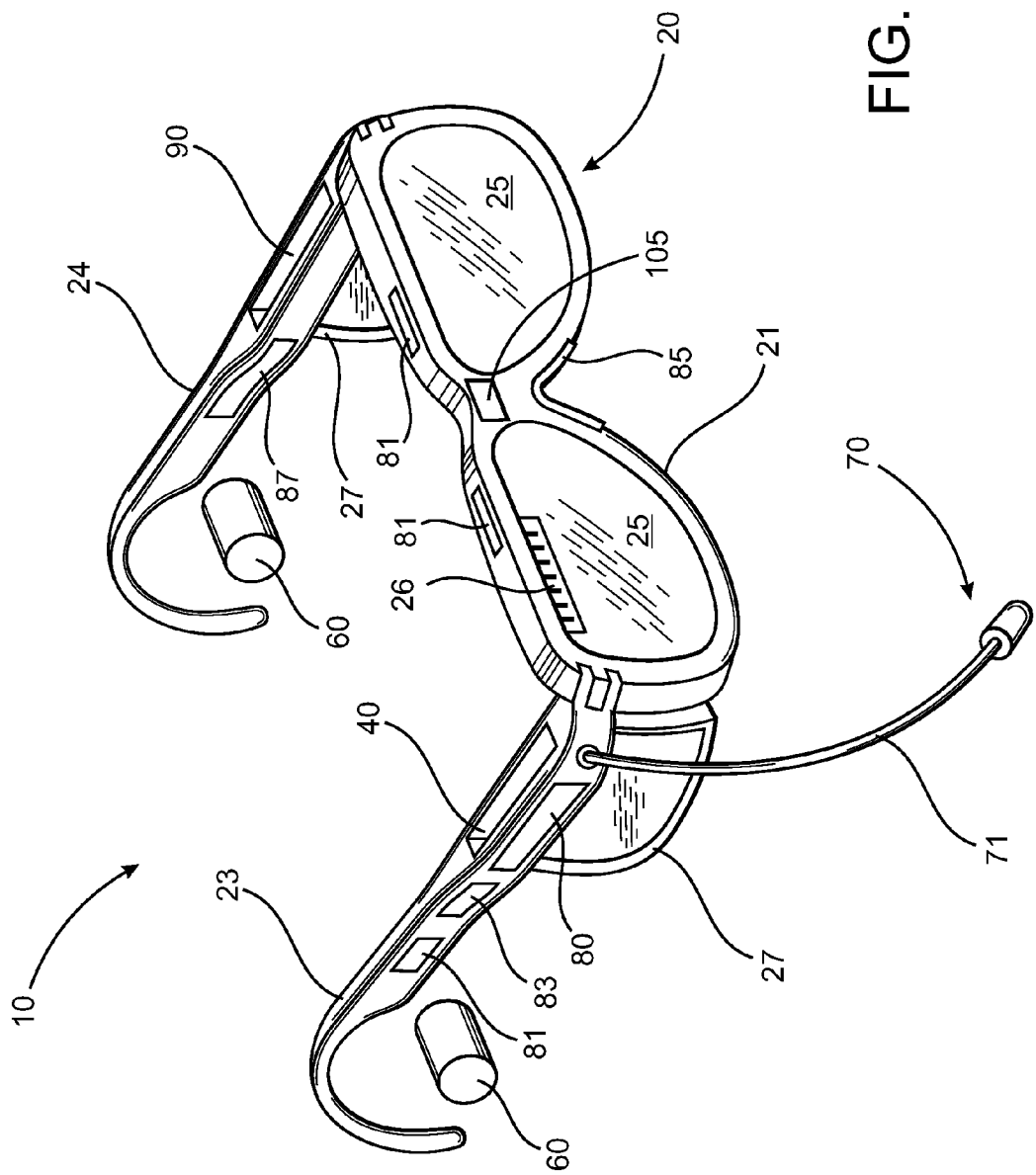
FIG. 1 is a perspective view of one embodiment of a communication eyewear assembly in accordance with the present invention.

As seen in FIG. 1, the communication eyewear assembly 10 comprises a frame assembly 20 which is structured to be worn on a person's head. Accordingly, the frame assembly 20 is structured to be supportably disposed on the wearer so as to maintain at least one substantially transparent eye panel 25 in a generally shielding position in front of the wearer's eyes.

In the embodiment of FIG. 1, the frame assembly 20 comprises a front frame member 21 and two eye panels 25 coupled thereto. In this embodiment, each eye panel 25 is structured to substantially shield the front of a different corresponding eye of the wearer while also permitting clear vision therethrough.

For applications where it is desirable to reduce the brightness of light perceived by the wearer's eyes, the eye panels 25 can be tinted. For applications where it is desirable to reduce the amount of harmful wavelengths of light reaching the wearer's eyes, the eye panels 25 can include ultraviolet protection such as UV coatings. The eye panels 25 can also be polarized for protective purposes and/or for viewing enhancement purposes. The eye panels 25 can also comprise prescription lenses. In at least one embodiment, the eye panels 25 can also comprise a shatterproof material of construction for additional protection in the event of significant impact to the eye panels 25 by a foreign object.

The frame assembly 20 further comprises at least one leg 23, 24 structured to effectively retain and position the front frame member 21 in front of the wearer's eyes during activity of the wearer. In the embodiment of FIG. 1, the frame assembly 20 comprises a first leg 23 and a second leg 24, each leg 23, 24 structured to be connected to opposite sides of the front frame member 21 and extend outwardly from a rear thereof. The legs 23, 24 are disposed in a generally perpendicular relation to the front frame member 21 so as to extend over and grip the wearer's ears when the front frame member 21 is operatively disposed in front of the wearer's eyes.

In at least one embodiment, the frame assembly 20 further comprises pair of side eye panels 27. Each side eye panel 27 is disposed and structured to substantially shield a different eye of the wearer. Moreover, the side eye panels 27 can be further structured to permit clear peripheral vision therethrough. As shown in FIG. 1, in at least one embodiment, the side eye panels 27 are each coupled to a different leg 23, 24. As with the eye panels 25, the side eye panels 27 can be tinted, UV coated, and/or polarized. The side eye panels 27 can also comprise a shatterproof material of construction.

Turning now to the communication aspects of the present invention, the communication eyewear assembly 10 provides for wireless communication between a wearer and other entities, such as, but not limited to, other wearers, control stations, broadcast stations, network servers, remote network peers, local and/or remote data sources, etc. By way of example, the wireless communication could involve a wearer located on a factory floor communicating with a manager located in a control station. As another example, the wireless communication could involve a wearer participating in an investigation of a hazardous event while in contact with an emergency response vehicle and/or a related dispatch center. As yet another example, the wireless communication could involve a wearer participating in an interactive sport or game together with a plurality of other participants in real time and/or space. These examples are meant for illustrative purposes only, as the present invention can apply to a variety of other applications and circumstances.

Accordingly, the communication eyewear assembly 10 comprises at least one processor 40 which is coupled to the frame assembly 20. The processor 40 is structured and disposed to receive an incoming data signal, typically from a remote location. For example, in one embodiment, the incoming data signal comprises real-time voice data, such as from another person with whom the wearer is communicating. In another embodiment, the incoming data signal comprises environmental data, such as from a remotely stored and transmitted database file. The processor 40 is further structured and disposed to transmit an outbound data signal to another entity, such as real-time voice data from the wearer to another person with whom the wearer is communicating. Further details of the multimedia communication capabilities of the processor 40, including the incoming and outbound visual signals, environmental, and locational data, etc., are discussed in more detail below, particularly with regard to the zone of safety capability.

In at least one embodiment, the processor 40 is structured and disposed to fit inside of the frame assembly 20. For example, in the embodiment of FIG. 1, the processor 40 is disposed inside of the first leg 23. It should be noted, however, that it is within the scope and intent of the present invention that the processor 40 can be structured and disposed to fit inside of other portions of the frame assembly 20, including, but not limited to, the second leg 24, the front frame member 21, etc.

The communication eyewear assembly 10 further comprises a power supply 90 structured and disposed to provide power to the processor 40. The power supply 90 can also be structured to supply power to other components of the assembly 10. In at least one embodiment, the power supply 90 is structured and disposed to fit inside of the frame assembly 20. For example, in the embodiment of FIG. 1, the power supply 90 is disposable inside of the second leg 24. It should be noted, however, that it is within the scope and intent of the present invention that the power supply 90 can be structured and disposed to fit inside of other portions of the frame assembly 20, including, but not limited to, the first leg 23, the front frame member 21, etc. The power supply 90 can also be rechargeable. For example, in one embodiment, the power supply 90 comprises a rechargeable battery pack that can be charged by an external power source that has been removably coupled to the assembly 10.

The communication eyewear assembly 10 further comprises at least one earpiece 60 structured to be disposed in either wired or wireless communication with the processor 40 and further structured to be disposed at one of the wearer's ears. As such, the processor 40 retransmits a received incoming audio signal to at least one earpiece 60, which in turn communicates the incoming audio signal to the wearer. With specific reference to the embodiment of FIG. 1, the communication eyewear assembly 10 comprises two earpieces 60, each of which are structured to be disposed at a different one of the wearer's ears. Moreover, in the embodiment of FIG. 1, the earpieces 60 are further structured to be at least partially inserted into the wearer's ears when disposed in their respective operative orientations.

With regard to inter-component connectivity as well as remote connectivity, the processor 40 comprises at least one transceiver structured to facilitate wireless communication. For example, with reference to the embodiment of FIG. 2, the processor 40 can comprise a first transceiver 42 and a second transceiver 44. The first transceiver 42 is structured to receive an incoming data signal from a remote source, and is also structured to transmit an outbound data signal to a remote destination. The data signal can include a wide variety of information, including, but not limited to, audio and/or visual information. In at least one embodiment, the first transceiver utilizes radio frequency communication. It is, however, within the scope and intent of the present invention that other suitable wireless technologies may also be utilized, including, but not limited to cellular, satellite, WIFI, WIMAX, BLUETOOTH, etc. The outbound data signal can comprise an audio signal corresponding to the wearer's voice which has been picked up by an outbound microphone assembly 70, such as the one shown in FIG. 1 and described in greater detail below. Similarly, an outbound visual signal will ordinarily correspond to an image captured by a camera assembly 105, also described in greater detail below. The outbound data signal can also comprise information detected by various sensors, as discussed further below.

The processor 40 can also comprise a local data storage capability or "memory" 43, such as for use in scenarios that require local storage and convenient access to specific data.

Figure 2:
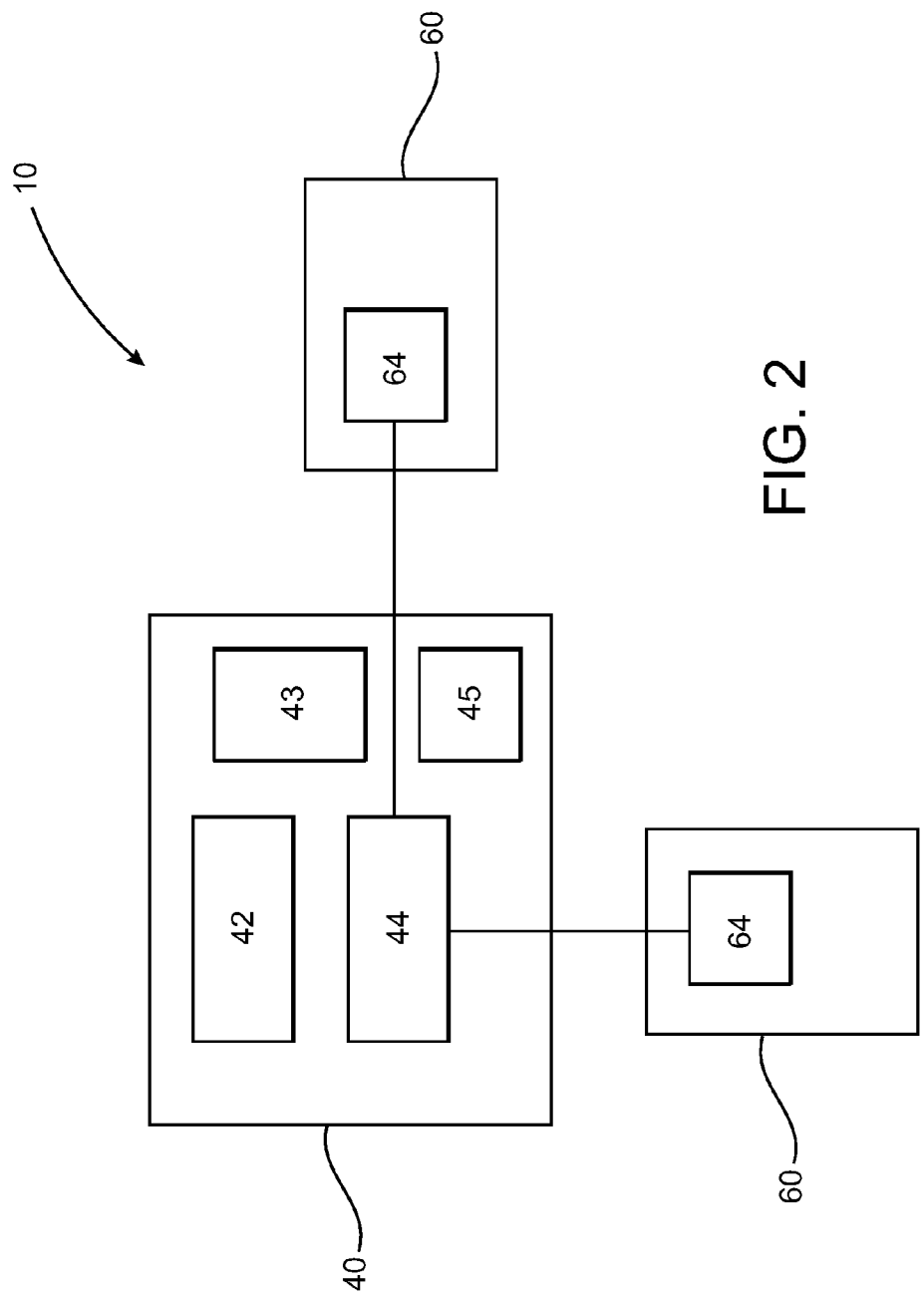
FIG. 2 is a schematic illustration of one embodiment of a transceiver configuration in accordance with the present invention.

The second transceiver 44 of FIG. 2 is structured to wirelessly communicate with the earpieces 60. In one embodiment, the second transceiver utilizes radio frequency communication technology. In another embodiment, the second transceiver utilizes magnetic induction communication technology. It is, however, within the scope and intent of the present invention that other suitable wireless technologies may also be utilized, including, but not limited to BLUETOOTH technology. In an alternative embodiment, the processor 40 comprises a single transceiver structured to communicate with remote entities as well as with the earpieces 60.

In addition, each earpiece 60 comprises an earpiece transceiver 64 structured to facilitate communication with the processor 40. For example, in the embodiment of FIG. 2, the earpiece transceivers 64 are each disposed in wireless communication with the second transceiver 44. In such an embodiment, the specific communication technology of the earpiece transceivers 64 matches that of the second transceiver 44, such as, but not limited to, radio frequency technology, magnetic induction technology, BLUETOOTH, etc. In a further embodiment, each earpiece transceiver 64 is uniquely identifiable by the processor 40. For example, in one such embodiment, each earpiece transceiver 64 comprises a unique signature, such as a radio, BLUETOOTH or magnetic identification, which is recognizable by the processor 40. Accordingly, the processor 40 can transmit different content to each earpiece transceiver 64, as may be desired.

As indicated, above, the communication eyewear assembly 10 is additionally structured to identify a zone of safety about the wearer and to notify the wearer and/or others of the zone of safety. In particular, as discussed next, the processor 40 is structured to receive, send, and process a variety of data associated with ascertaining and/or identifying the zone of safety. This includes multimedia communication capabilities associated various sources and recipients of information, preferably via a wireless communication system.

Figure 3:
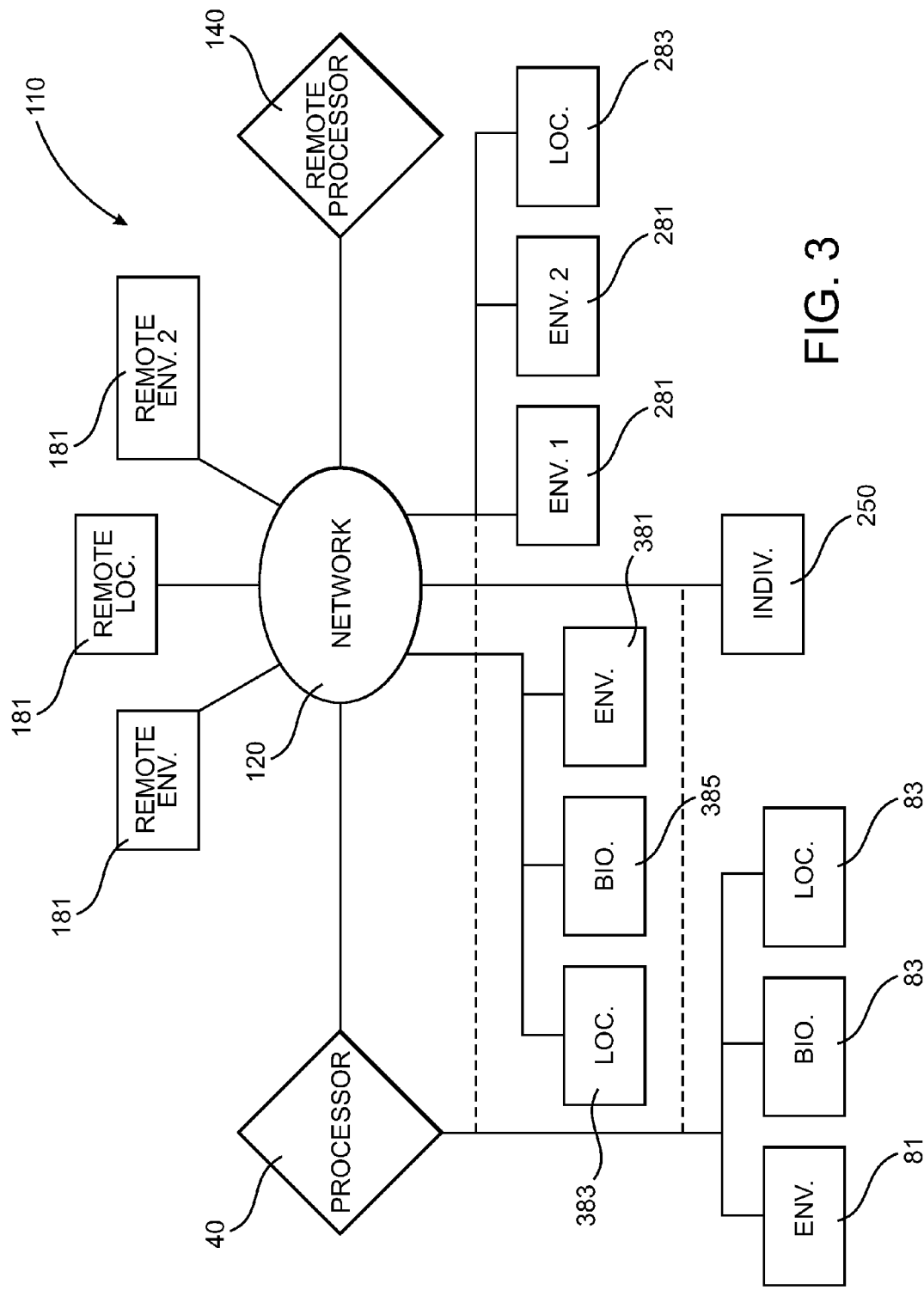
FIG. 3 is a schematic illustration of one embodiment of a wireless communication system in accordance with the present invention.

With reference to FIG. 3, a schematic illustration depicts one embodiment of a wireless communication system 110 in accordance with the present invention. In particular, the processor 40 and various electronic data sources are structured to communicate with one or more communication networks 120 and protocols, such as, but not limited to, the Internet, cellular, satellite, WIFI, WIMAX, WLAN, WAN, LAN, WIFI hotspot, Intranet, ZIGBEE, ENOCEAN, etc. The various data sources can also communicate directly with the processor 40, using a variety of wireless technologies and protocols, such as via cellular, satellite, WIFI, WIMAX, ZIGBEE, ENOCEAN, BLUETOOTH, etc. Further, a remote processor 140 can facilitate processing and organization of data and other information, and may be structured to enhance and/or supplement the computational capacity of the in-frame processor 40, such as for determining the zone of safety. For all of the foregoing, it is noted that a variety of processing and data storage hardware and software, operating systems, and communication protocols may be implemented to carry out various embodiments of the present invention.

Continuing with the representative embodiment of FIG. 3, the processor 40 can communicate with remote data sources such as a remote environmental data source 181 or a remote locational data source 183. Environmental data can include general as well as specific information about the environment around the eyewear wearer. By way of example, only, information provided by the remote environmental data source 181 can pertain to potentially dangerous temperatures, toxic gases, airborne chemical or biological agents, ionizing radiation, potentially damaging energy fields, atmospheric pressure, etc. Locational data can include information about the location of the wearer as well as the location of items of interest. For instance, the information provided by the remote locational data source 183 can include, but is not limited to, the wearer's position on the face of the earth, location of restricted areas, relative locations of potentially hazardous stationary or moving objects around the eyewear wearer, etc.

The processor 40 can also communicate with local data sources such as a local environmental data source 281 or a local locational data source 283 generally situated in the vicinity of the area in which the wearer is operating. The environmental and locational data provided by the local sources 281,283 can comprise similar types of information to that provided by the remote data sources 181,183, as discussed above. Moreover, they may comprise additional stored and/or real-time information based on direct local measurements, observations, inputs, etc. For instance, in addition to archived or stored information, the local data sources can comprise a wide variety of active devices, such as thermometers, altimeters, locational beacons, alarms, motion sensors, and sensors of biological agents, chemical agents, and radiation, among others.

The processor 40 can also communicate with data sources worn by the wearer such as a personal environmental data source 381, a personal locational data source 383, or a biometric data source 385, which may be embedded in the wearer's clothing or attached thereto, such as via arm band, leg band, belt, backpack, etc. The environmental and locational data provided by the personal sources 381,382 can comprise similar types of information to that provided by the remote data sources 181,183 and the local data sources 281,283, as discussed above. The biometric data sources 385 may comprise additional stored and/or real-time information based on biometric data of the wearer, such as, but not limited to, body temperature, heartbeat, and rate of respiration. For instance, in addition to archived or stored information, the personal biometric data sources can comprise a wide variety of active devices such as body temperature monitors, heartbeat monitors, respiration monitors, perspiration monitors, muscle reflex monitors, blood sugar monitors, etc.

The processor 40 can also communicate with personal data sources 250 worn by individuals other than the wearer, particularly those in proximity to the wearer. Information obtained and provided by such data sources 250 can comprise similar types of information to that provided by the remote data sources 181,183, the local data sources 281,283, and the personal sources 381,383,385 as discussed above.

In addition, the communication eyewear assembly 10, itself, can include similar types of data sources integrated therewith, which are each structured to communicate with the processor 40. Accordingly, with reference again to FIGS. 1 and 3, the communication eyewear assembly 10 comprises one or more environmental sensors 81 which are coupled to the frame assembly 20. The environmental sensors 81 are structured and disposed to obtain specific information about the environment around the eyewear wearer. By way of example, only, information provided by the environmental sensors 81 can pertain to potentially dangerous temperatures, toxic gases, airborne chemical or biological agents, ionizing radiation, potentially damaging energy fields, atmospheric pressure, ultrasonic waves, etc.

Similarly, the communication eyewear assembly 10 comprises one or more locational sensors 83 which are coupled to the frame assembly 20 and structured to communicate with the processor 40. The locational sensors 83 are specifically disposed and structured to provide locational data which can include information about the location of the wearer as well as the location of items of interest. As depicted in the embodiment of FIG. 1, a locational sensor 83 is disposed inside of the first leg 23. It should be noted, however, that it is within the scope and intent of the present invention that the locational sensors 83 can be structured and disposed to fit inside of other portions of the frame assembly 20, including, but not limited to, the second leg 24, the front frame member 21, etc.

The processor 40 is structured to utilize information from the locational sensor 83 and/or other aforementioned sources of locational data to determine the wearer's position on the face of the earth, location of restricted areas, relative locations of potentially hazardous stationary or moving objects around the eyewear wearer, etc. For instance, with regard to determining the wearer's global position, the locational sensor 83 can be structured to receive signals from the Global Positioning System (GPS) via a geomagnetic sensing capability. Such information can be used to determine the wearer's general location and also to determine situational awareness, such as whether the wearer is venturing into restricted areas or perhaps is immobile in excess of a predetermined amount of time, signaling possible incapacitation.

In a further embodiment, the processor 40 can utilize the locational data to determine in real time the wearer's vertical and/or horizontal and/or angular orientation thus permitting precise characterization of the wearer's location and orientation in one, two, or three spatial dimensions. Such information can include gyroscopic orientation, speed, and/or acceleration. Here too, such information can be used to determine situational awareness, such as whether the wearer is venturing into restricted areas or perhaps may be horizontally oriented for too long a period, thus may be incapacitated and require assistance. By way of practical example, such information can be utilized to inform a company on the location and status of a worker at a work site, and to facilitate a decision on whether to send help as well as to notify first responders of the wearer's status and location.

The communication eyewear assembly 10 also comprises one or more biometric sensors 85 which are coupled to the frame assembly 20 and structured to communicate with the processor 40. The biometric sensors 85 are specifically disposed and structured to provide biometric data on a variety of bodily functions such as body temperature, heartbeat, rate of respiration, perspiration, muscle reflex, blood sugar, etc. As depicted in the embodiment of FIG. 1, a biometric sensor 85 is disposed on the nasal bridge portion of the front frame member 21. It should be noted, however, that it is within the scope and intent of the present invention that the biometric sensors 85 can be structured and disposed to fit on or inside of other portions of the frame assembly 20, including, but not limited to, the first leg 23, the second leg 24, etc.

The processor 40 is structured to utilize information from the biometric sensor 85 and/or other aforementioned sources of biometric data to determine the wearer's physical status. The processor is further structured to compare the wearer's present physical status with predetermined criteria and to notify the wearer and/or others of the wearer's physical status.

Figure 4:
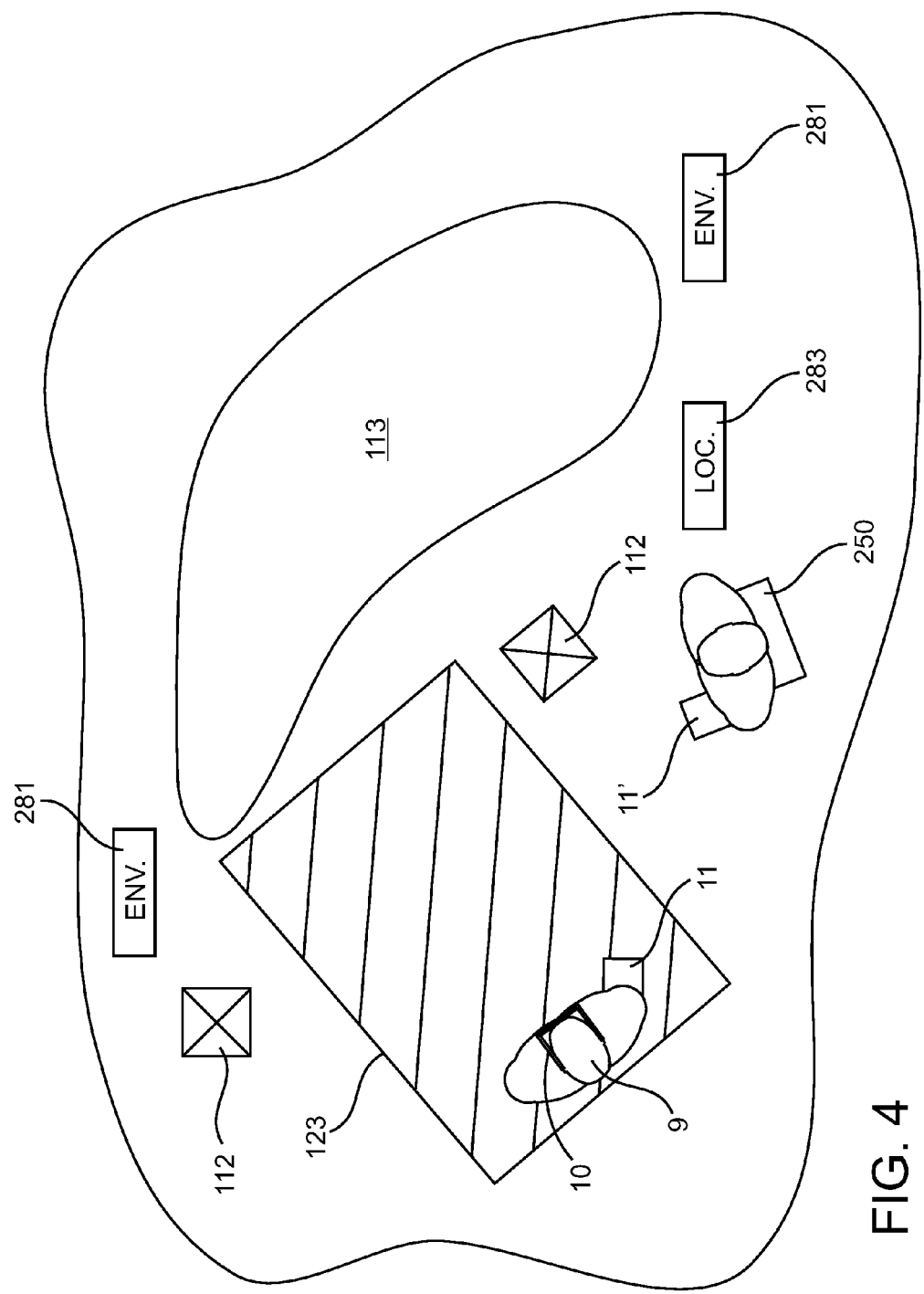
FIG. 4 is a schematic illustration of one embodiment of an established zone of safety in accordance with the present invention.

With reference to FIG. 4, the above-described data can be processed by the processor 40 and/or remote processor 140 to identify a zone of safety about the wearer. The processors can provide a wide variety of associated functionality, such as in some cases identifying a predetermined zone of safety based on observed parameters, or in other cases, calculating a zone of safety based on data received. In a further embodiment, the processor 40 can be disposed in communication with the remote processor 140 to receive information on the zone of safety. Further still, in some embodiments, the remote processor 140 can be structured to calculate and/or identify the zone of safety and to notify the processor 40 accordingly.

By way of example only, one particular embodiment of an established zone of safety 123 in a hazardous environment is schematically illustrated in FIG. 4. In this embodiment, the zone of safety 123 is calculated based on data involving hazardous objects 112, such as contaminated pieces of equipment from a wreckage site, as well as a hazard area 113, such as the affected area associated with a chemical spill, as well as locational data including the global position of the event and the relative locations of a wearer 9 and the hazard area or zone 113. Accordingly, the processor 40 is structured to process locational data as well as data on the hazardous objects and the hazardous environment provided by various local and/or remote sensors in order to distinguish safe areas, features, and objects from dangerous ones, and thus determine, calculate, and generate the zone of safety 123 accordingly. While the zone of safety 123 shown in FIG. 4 is two dimensional, as noted above, the zone of safety can be determined for one, two, or three dimensions, as well as comprise a temporal aspect, such as in the case of a dynamic, changing situation.

Once the processor 40 and/or remote processor 140 determine the zone of safety 123, the communication eyewear assembly 10 is capable of notifying the wearer 9 and/or others of potentially hazardous conditions around the wearer. For instance, the eyewear assembly 10 worn by the wearer 9 can be structured to notify the wearer 9 as to the existence of the zone of safety 123 (and its boundaries) by displaying hazardous conditions information through a variety of video means, or, through a pre-determined audio spoken message or tone to the eyewear's audio earpieces 60. In a further embodiment, the wearer 9 is notified by the eyewear assembly 10 via vibrational means, gentle electrical shock, heat, etc., such as via the physical notification mechanism 87 shown in FIG. 1. In one embodiment, the physical notification mechanism 87 comprises a vibration device. In another embodiment, the physical notification mechanism 87 comprises an electro-shocking device. In yet another embodiment, physical notification mechanism 87 comprises a heating device.

Similarly, other individuals in the vicinity can receive appropriate zone of safety notification on their personal communication device 11', as can the wearer 9 if he/she is wearing a separate personal communication device 11. Moreover, remote locations such as control stations, dispatch stations, etc., can receive the zone of safety notification and process the associated information accordingly.

In accordance with the monitoring of the wearer and/or the communication eyewear 10 worn by the wearer, the present invention can further involve the assignment of a unique ID 45 to the wearer's communication eyewear assembly 10. Further, the unique ID can be transmitted to a remote location or as part of normal wireless transmissions to the wearer's personal communication device 11 for purposes of confirming the identity of the wearer, and times of use. The unique ID 45 can constitute a singular 'public' identity, similar to that associated with a cellphone account. In contrast, while current telecommunication eyewear units might have a separate BLUETOOTH identity for use in connection with peripheral devices, such limited identity is not specifically tied to the eyewear or the wearer in the manner contemplated herein. In the present invention, each eyewear/user can have an identity. For instance, the individualized identity affiliated with the unique ID 45 can be used in large industrial plants to monitor conduct and productivity of corresponding workers/wearers. On the physical level, the unique ID can be contained in the processor 40 and/or the locational sensors 83, either alone or in combination with processor 40, or by separate means such as those involving local RFID, for purposes of establishing location and movement from point to point.

Figure 4A:
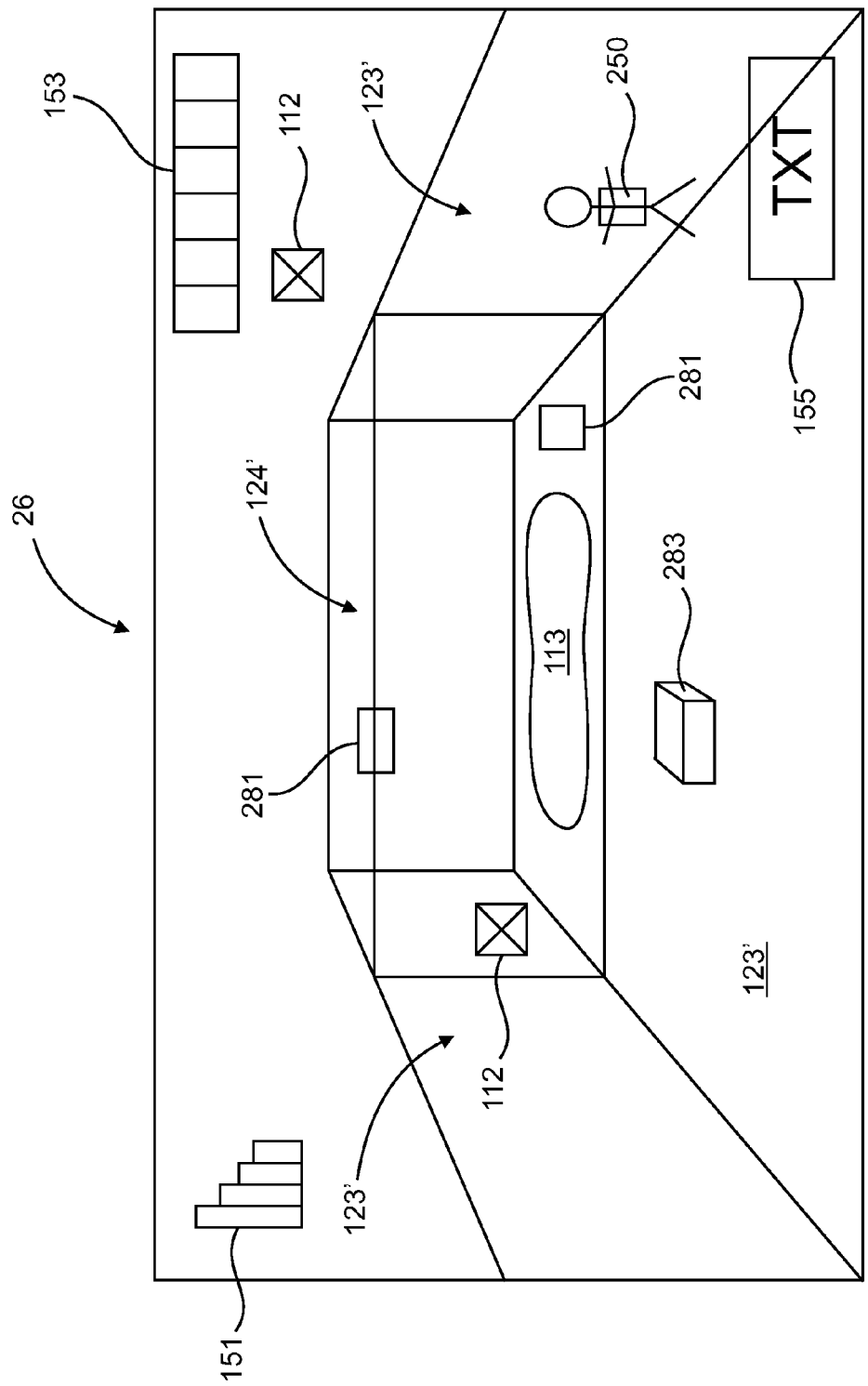
FIG. 4A is a schematic illustration of one embodiment of a display presentation in accordance with the established zone of safety of FIG. 4.

Turning to some of the visual features of the present invention, FIG. 4A is a schematic illustration of one embodiment of a visual display presentation associated with a display unit 26 in accordance with the established zone of safety 123 of FIG. 4. As depicted in this embodiment, the zone of safety 123' comprises three spatial dimensions and is also depicted in contrast to a zone of danger 124'. In a further embodiment, wherein the display is updated in real-time, the zone of safety 123' also comprises a temporal dimension. The visual display is primarily displayed in connection with the communication eyewear assembly 10 worn by the wearer 9 but can also be displayed on other devices as well, including personal communication devices 11,11', or remote displays, such as those associated with a control center or dispatch.

As seen in FIG. 4A, the three-dimensional zone of safety 123' borders a corresponding danger zone 124' which encompasses a spill zone or similar type of hazard area 113. The zone of safety 123' includes a two-dimensional base area, along with a height dimension, such as to avoid vapors associated with the spill zone 113, hazardous objects 112, etc. Other objects and items of FIG. 4 are also represented by the visual display presentation shown in FIG. 4A. In a further embodiment, the display unit 26 is structured to present additional information in graphical and/or script format, such as a communication reception gauge 151, a danger scale 153, and/or a text box 155. Each of these can be customized to represent a variety of safety, environmental, personal, and/or communicative data.

For instance, information received from the aforementioned sensor devices embedded in the communication eyewear assembly 10, or other remote sources can be graphically and/or textually displayed via the display unit 26, including, by way of example, locational information about potentially hazardous stationary or moving objects around the wearer. Additionally, the processor 40 is structured to identify whether a potentially hazardous moving object 112 is increasing its risk to the wearer 9, through movement of the object itself toward the wearer, or the wearer toward the object. For example, the communication eyewear assembly 10, through use of the processor 40 and multiple microphones 76 (discussed in more detail, below), can cooperatively determine whether a potentially dangerous object 112 is approaching the wearer 9, as well as the object's 122 position, via triangulation or other appropriate calculations, and inform the wearer accordingly.

In a further embodiment, the assembly 10 is structured to determine existence of extraordinary circumstances based on changes or lack of changes in the data, and to notify the wearer and/or others of same. The data can comprise biometric or other data of the individual wearer and/or that of the environment surrounding the wearer. Examples of such data include, but are not limited to, potentially dangerous ambient temperatures, toxic gases, airborne chemical or biological agents, ionizing radiation, or other potentially damaging energy fields, atmospheric pressure, unusual body temperature, heartbeat, or rate of respiration, etc. The data can be used by the processor 40 alone or in conjunction with the remote processor 140 to assess the well-being of the wearer 9 and to optionally notify remote locations, of the wearer's health status, possible distress, etc.

More specifically, the processors 40, 140 can compare received data with corresponding baseline data to determine the potential existence of a threat to the well-being of the wearer 9, and autonomously and wirelessly report the information and condition to remote sources. Conditions determined to constitute an anomaly or other unusual occurrence, can thus signal a potential risk to the wearer, which in turn can trigger a corresponding notification, such as via an alarm feature. Additionally, the information could be used for purposes of security, insurance documentation, or other documentation useful to human resources at the employer of the wearer.

Figure 5:
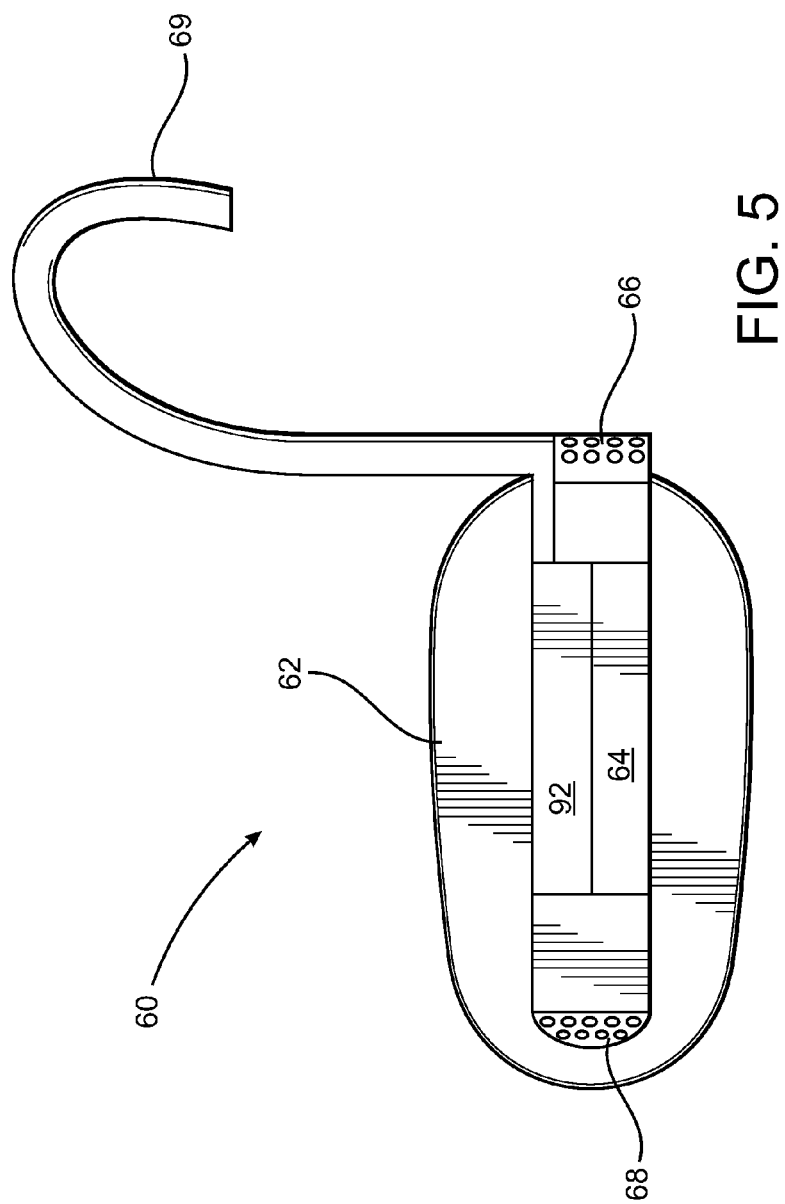
FIG. 5 is a cross section view of one embodiment of an earpiece in accordance with the present invention.

Referring now to some audio capabilities of the communication eyewear assembly 10, reference is made to the embodiment of FIG. 5, wherein the earpiece 60 further comprises a speaker assembly 68 structured and disposed to audibly communicate an incoming audio signal (audio data) to the wearer. In this embodiment, the speaker assembly 68 is structured to be at least partially inserted into the ear of the wearer when disposed in an operative orientation.

The earpiece 60 is additionally structured to substantially muffle ambient noise, further facilitating communication. As shown in the embodiment of FIG. 5, at least a portion of the earpiece 60 is structured to be inserted into the wearer's ear so as to substantially muffle the ambient noise. More specifically, the earpiece 60 of FIG. 5 additionally comprises a disposable insert 62 structured to substantially muffle the ambient noise. The disposable insert 62 can be formed, for instance, from a sound-deadening, compressible material, such as high density foam, although a variety of other suitable materials may also be utilized, including materials which readily conform to fit inside of the ear canal. For at least sanitary purposes, the disposable insert 62 can be discarded and replaced after use.

Also depicted in FIG. 5 is the earpiece transceiver 64, which is communicatively coupled to both the speaker assembly 68 and an optional earpiece microphone assembly 66. The earpiece transceiver 64 is structured to facilitate communication between the respective earpiece components 66, 68 and the processor 40. The earpiece 60 further comprises an earpiece power supply 92 structured and disposed to provide power to the speaker assembly 68 and the earpiece microphone assembly 66, as well as to the earpiece transceiver 64. In at least one embodiment, the earpiece power supply 92 can be rechargeable.

Referring again to FIG. 1, the communication eyewear assembly 10 further comprises an outbound microphone assembly 70 disposed and structured to pick up an outbound audio signal from the wearer and transmit the outbound audio signal to the processor 40. For instance, in the embodiment of FIG. 1, the outbound microphone assembly 70 comprises an adjustable elongate segment 71 which extends from the first leg 23 of the frame assembly 20. The adjustable elongate segment 71 is structured to permit adjustment of the microphone assembly 70 in front of the wearer's mouth to better pick up the outbound audio signal, which, in at least one embodiment, comprises real-time voice data of the wearer's spoken voice. In this embodiment, the outbound microphone assembly 70 is in disposed in wired communication with the processor 40. However, in another embodiment, the outbound microphone assembly 70 can be disposed in wireless communication with the processor 40, such as with the second transceiver 44.

Figure 6:
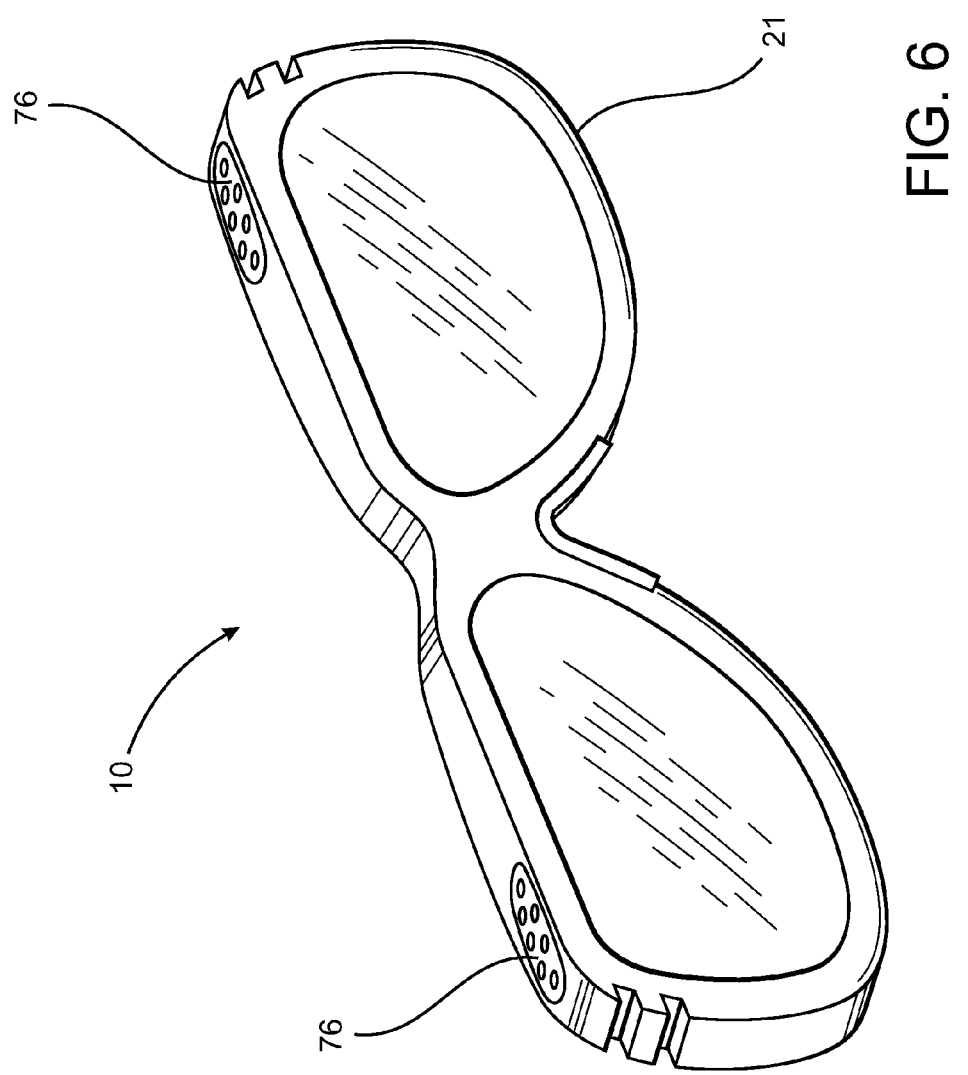
FIG. 6 is a partial perspective view of another embodiment of a microphone assembly in accordance with the present invention.

The communication eyewear assembly 10 can be further structured to enhance an incoming and/or outbound audio signal based on an ambient audio signal. This can include enhancing a voice component of the received audio data, such as that of the wearer or that of others in the vicinity of the wearer. This can also include enhancement of informational sounds such sirens, whistles, horns, gunfire, explosions, and other identifiable audio sounds that are distinct from the general background noise. By way of example, the ambient audio signal will typically comprise the background sounds generated by the surrounding environment. As such, one or more ambient microphone assemblies can be disposed and structured to pick up an ambient audio signal and transmit the ambient audio signal to the processor 40 for enhancement processing, filtering, etc. As seen in the embodiment of FIG. 5, the earpiece microphone assembly 66 can serve as an ambient microphone assembly. As another example, one or more frame microphone assemblies 76, such as those depicted in FIG. 6, can provide an ambient microphone capability.

Referring now to some additional operational capabilities of the communication eyewear assembly 10, and with reference again to FIG. 1, the communication eyewear assembly 10 further comprises a user interface 80, such as a touch sensitive interface, brain wave monitor, motion sensor, optical recognition monitor, etc. The user interface is disposed in communication with the processor 40 and is structured to relay received input to the processor 40 so as to permit selective control of at least one type of input parameter that can be received and processed by the processor 40. By way of further example, the wearer can interact with various embodiments of the user interface 80 by touching it (e.g., swiping, tapping, touching and holding), using forehead movement, nose movement, ear movement, eye movement, eyelid movement, or in some cases by simply thinking, etc., as well as ay combinations thereof. For instance, in one embodiment, the user interface 80 can be structured to facilitate selection or control of the visual display of incoming data. In another embodiment, the user interface 80 can be structured to facilitate control of audio volume. In still another embodiment, the user interface 80 can be structured to facilitate input of an emergency distress signal, such as a pattern of successive taps, etc. The user interface 80 can be disposed in a variety of suitable locations, such as on the frame assembly 20 or on at least one of the earpieces 60. In the embodiment of FIG. 1, for instance, the user interface 80 is disposed on the first leg 23.

As an additional control interface feature, the processor 40 can be structured to process audio instructions received directly from the wearer 9 via the microphone 70, such as for manipulation and adjustment of display and/or audio settings, or to initiate a distress signal.

Turning again to FIG. 6, two frame microphone assemblies 76 are each disposed on a different side of the front frame member 21. As with the earpiece microphone assemblies 66, discussed above, the frame microphone assemblies 76 are disposed and structured to pick up an ambient audio signal and transmit the ambient audio signal to the processor 40. Further, in the embodiment of FIG. 6, a distance of several inches, preferably about four to five inches (4"-5"), which separates the frame microphone assemblies 76 from one another provides sufficient separation such that disparate sources of sound can be geometrically differentiated by the processor 40 based on the variations in the audio signals picked up by each individual frame microphone assembly 76. In this embodiment, the frame microphone assemblies 76 are in disposed in wired communication with the processor 40. However, in another embodiment, the frame microphone assemblies 76 can be disposed in wireless communication with the processor 40, such as with the second transceiver 44. It should also be noted that, other numbers of frame microphone assemblies 76, could be used. Moreover, in other embodiments, the frame microphone assemblies 76 can also be disposed at other suitable locations, such as on the legs 23, 24, or elsewhere.

With further reference to FIG. 5, in at least one embodiment, the earpieces 60 are further structured to be removably secured to the frame assembly 20 for storage. As seen in FIG. 5, each earpiece 60 comprises a clip 69 structured to removably secure the earpiece 60 to the frame assembly 20 when the earpiece 60 is not in use. For instance, the earpieces 60 can be removably secured to at least one of the legs 23, 24 when disposed in a stored orientation. It is within the scope and intent of the present invention, however, that the earpieces 60 may also be removably secured to other portions of the frame assembly, including, but not limited to, the front frame member 21. In a still further embodiment, the earpiece 60 and the frame assembly 20 can be cooperatively structured to charge a rechargeable earpiece power supply 92 when the earpiece 60 is disposed in a stored orientation.

Turning now to some additional aspects of the present invention involving visual communication, the assembly 10 further includes a camera assembly 105 disposed and structured to pick up an outbound visual signal, which may comprise image data and/or video data. Referring again to FIG. 1, in one embodiment, the camera assembly 105 comprises a single camera element disposed on a central area of the front frame member 21 and facing towards a field of view from the wearer's perspective. It should be noted, however, that it is within the scope and intent of the present invention that a plurality of cameras elements may be utilized, and further, that one or more camera assemblies 105 may be disposed on a variety of other suitable portions of the assembly 10, including, but not limited to, other positions on the front frame member, on the legs 23, 24, etc. Because the assembly 10 is worn on a wearer's head, the outbound visual signal will typically reflect the view as seen from the wearer's perspective, although other views may also be captured including, but not limited to, views directed behind the wearer. Further, the camera assembly 105 will typically pick up visual signals in the visible spectrum. However, in a further embodiment, the camera assembly 105 can pick up visual signals in other spectra, including, but not limited to, the infrared spectrum.

As with the other aforementioned multimedia components, the camera assembly 105 is further structured to transmit the outbound visual signal to the processor 40. Accordingly, the processor 40 is structured to transmit to another entity the outbound visual signal or data received from the camera assembly 105.

As noted, above, the processor 40 is also structured to receive an incoming visual signal from a remote location. For instance, the incoming visual signal may comprise image data and/or video data, such as pictures or movies from a remotely stored and transmitted data file, or real-time feeds from remote sources such as hidden cameras, satellites, aerial vehicles, control towers, etc. As such, the assembly 10 includes at least one display unit 26 disposed and structured to display the incoming visual signal to the wearer. For example, with reference to the embodiment of FIG. 1, the assembly 10 comprises a single display unit 26 which is at least partially disposed on an exterior surface of one of the eye panels 25. The display unit 26 is further structured to project an image of the received incoming visual signal towards the wearer's eye. In another embodiment, the display unit 26 is structured to project an image of the received incoming visual signal onto the eye panel 25 such that the wearer's eye can perceive the displayed visual signal as emanating from the interior and/or exterior surface of the eye panel 25. Although the embodiment of FIG. 1 depicts the display unit 26 positioned on the exterior surface of the eye panel 25, the display unit 26 may alternatively be disposed on the interior surface of the eye panel 25, or within the eye panel 25.

In a further embodiment, the assembly 10 includes at least one display unit 26 corresponding to each eye panel 25. For instance, the embodiment of FIG. 7 depicts two other variations of the display unit 26', 26", each coupled to a respective eye panel 25. As depicted, a first display unit 26' is disposed on the interior surface of one eye panel 25, and is further structured to display the incoming visual signal in a partial field of vision defined by the eye panel 25. The second display unit 26" is disposed within the other eye panel 25', and is further structured to display the incoming visual signal in substantially the entire field of vision defined by the eye panel 25'.

The display unit 26, 26', 26" may physically comprise a variety of suitable materials and structures, including active and passive electro-mechanical, opto-mechanical, and/or and electro-optical components. For example, the display unit 26, 26', 26" may comprise flat panel display technology, such as, but not limited to, liquid crystal display (LCD) technology, organic light emitting diode (OLED) display technology, etc. Moreover, the display unit 26, 26', 26" can be further structured to at least partially correspond to the contour of the eye panel 25.

The display unit 26, 26', 26" can be additionally structured to maintain a substantially transparent state until receipt of the incoming visual signal from the processor 40, whereupon the display unit 26, 26', 26" will display the visual signal accordingly. In one such embodiment, the display of the incoming visual signal is physically triggered by an electrical input received by any of the display units 26, 26', 26" from the processor 40.

It should also be noted that, although the above description focuses on certain specific uses of the present invention, particularly those in a hazardous industrial work environment, the present invention could be readily applied to other scenarios, such as to military operations, fire and rescue operations, public safety operations, sports activities, interactive gaming, etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A communication eyewear assembly comprising:
   a frame assembly;
   at least one substantially transparent eye panel coupled to said frame assembly;
   said frame assembly structured to be supportably disposed on a wearer so as to maintain said at least one eye panel disposed in front of a wearer's eye;
   a processor coupled to said frame assembly, said processor structured and disposed to receive an incoming data signal from at least one source of data;
   said processor structured to utilize said data to generate zone of safety information corresponding to a physical zone of safety, said physical zone of safety defining a physical boundary in least one spatial dimension relative to a hazardous area;
   said processor further structured to communicate said zone of safety information to at least the wearer.

2. An assembly as recited in claim 1 wherein said zone of safety information comprises data pertaining to at least two spatial dimensions.

3. An assembly as recited in claim 2 wherein said zone of safety information comprises data pertaining to at least three spatial dimensions.

4. An assembly as recited in claim 1 wherein said zone of safety information comprises temporal data.

5. An assembly as recited in claim 1 wherein said processor coupled to said frame assembly is further structured to communicate with a remote processor structured to assist said processor coupled to said frame assembly.

6. An assembly as recited in claim 1 wherein said processor is further structured to determine existence of an extraordinary circumstance based on changes or lack of changes in said data, and further structured to notify the wearer of same.

7. An assembly as recited in claim 1 wherein said processor is further structured to determine existence of an extraordinary circumstance based on changes or lack of changes in said data, and further structured to notify an entity other than the wearer of same.

8. An assembly as recited in claim 1 further comprising a unique ID feature structured to communicate with a personal communication device of the wearer and/or remote devices.

9. An assembly as recited in claim 1 comprising at least one earpiece disposed in communication with said processor, and further structured to be disposed in operative proximity to the at least one of the wearer's ears, said at least one earpiece comprising a speaker assembly structured and disposed to audibly communicate an incoming audio signal to the wearer.

10. An assembly as recited in claim 9 wherein said at least one earpiece is further structured to substantially muffle ambient noise.

11. An assembly as recited in claim 10 wherein at least a portion of said at least one earpiece is structured to be inserted into the wearer's ear so as to substantially muffle ambient noise.

12. An assembly as recited in claim 11 wherein said at least one earpiece comprises a disposable insert structured to substantially muffle ambient noise.

13. An assembly as recited in claim 1 wherein said at least one data source is selected from a group consisting of a remote source, a local source, a device integrated with said communication eyewear worn by the wearer, a device worn by the wearer but not integrated with said communication eyewear, and a device worn by another individual in the vicinity of the wearer.

14. An assembly as recited in claim 1 wherein said data utilized to generate said zone of safety information is selected from a group consisting of environmental data, locational data of the wearer, locational data of potentially hazardous objects in the vicinity of the wearer, and biometric data of the wearer.

15. An assembly as recited in claim 1 wherein said assembly further comprises at least one display unit disposed in communication with said processor and structured to visually display a representation of said zone of safety to the wearer.

16. An assembly as recited in claim 1 wherein said processor is further structured to communicate said zone of safety information to at least one remote device.

17. A communication eyewear assembly comprising:
    a frame assembly;
    at least one substantially transparent eye panel coupled to said frame assembly;
    said frame assembly structured to be supportably disposed on a wearer so as to maintain said at least one eye panel disposed in front of a wearer's eye;
    a processor coupled to said frame assembly, said processor structured and disposed to receive an incoming data signal from at least one source of data;
    said processor structured to utilize said data to generate zone of safety information corresponding to a physical zone of safety, said physical zone of safety defining a physical boundary in least one spatial dimension relative to a hazardous area;
    said processor further structured to communicate said zone of safety information to the wearer and/or at least one remote device;
    said processor further structured to determine existence of an extraordinary circumstance based on changes or lack of changes in said data, and further structured to notify the wearer and/or at least one remote device of same; and
    a unique ID feature structured to communicate with a personal communication device of the wearer and/or remote devices.

18. An assembly as recited in claim 17 wherein said processor coupled to said frame assembly is structured to comprise said unique ID feature.

19. An assembly as recited in claim 17 wherein said unique ID feature is integrated with a locational sensor coupled to said frame.

20. An assembly as recited in claim 17 wherein said at least one data source is selected from a group consisting of a remote source, a local source, a device integrated with said communication eyewear worn by the wearer, a device worn by the wearer but not integrated with said communication eyewear, and a device worn by another individual in the vicinity of the wearer.

21. An assembly as recited in claim 17 wherein said data utilized to generate said zone of safety information is selected from a group consisting of environmental data, locational data of the wearer, locational data of potentially hazardous objects in the vicinity of the wearer, and biometric data of the wearer.

22. An assembly as recited in claim 17 wherein said assembly further comprises at least one display unit disposed in communication with said processor and structured to visually display a representation of said zone of safety to the wearer.

23. A communication eyewear assembly comprising:
a frame assembly;
at least one substantially transparent eye panel coupled to said frame assembly;
said frame assembly structured to be supportably disposed on a wearer so as to maintain said at least one eye panel disposed in front of a wearer's eye;
a processor coupled to said frame assembly, said processor structured and disposed to receive an incoming data signal from at least one source of data;
said processor structured to utilize said data to generate zone of safety information corresponding to a physical zone of safety, said physical zone of safety defining a physical boundary in least one spatial dimension relative to a hazardous area;
said processor further structured to communicate said zone of safety information to the wearer and/or at least one remote device;
at least one display unit disposed in communication with said processor and structured to visually display a representation of said zone of safety to the wearer;
said processor further structured to determine existence of an extraordinary circumstance based on changes or lack of changes in said data, and further structured to notify the wearer and/or at least one remote device of same;
a unique ID feature structured to communicate with a personal communication device of the wearer and/or remote devices; and
at least one earpiece disposed in communication with said processor, and further structured to be disposed in operative proximity to the at least one of the wearer's ears, said at least one earpiece comprising a speaker assembly structured and disposed to audibly communicate an incoming audio signal to the wearer, said at least one earpiece further structured to substantially muffle ambient noise, wherein at least a portion of said at least one earpiece is structured to be inserted into the wearer's ear so as to substantially muffle ambient noise.

24. An assembly as recited in claim 23 wherein said at least one data source is selected from a group consisting of a remote source, a local source, a device integrated with said communication eyewear worn by the wearer, a device worn by the wearer but not integrated with said communication eyewear, and a device worn by another individual in the vicinity of the wearer.

25. An assembly as recited in claim 23 wherein said data utilized to generate said zone of safety information is selected from a group consisting of environmental data, locational data of the wearer, locational data of potentially hazardous objects in the vicinity of the wearer, and biometric data of the wearer.

26. An assembly as recited in claim 23, wherein a physical means for communicating said zone of safety information is selected from a group consisting of sounds, audio messages, vibrations, electro-shock, heat, graphic displays, and textual displays.

27. An assembly as recited in claim 23 wherein said processor coupled to said frame assembly is further structured to communicate with a remote processor structured to assist said processor coupled to said frame assembly.

28. An assembly as recited in claim 23 wherein said processor is further structured to determine said extraordinary circumstance based on a health related data of the wearer.

29. An assembly as recited in claim 23 wherein said processor is further structured to determine said extraordinary circumstance based on a safety related data of the wearer.

30. An assembly as recited in claim 23 further structured to detect moving objects, and wherein said processor is further structured to incorporate data pertaining to the moving objects into said zone of safety information.

31. An assembly as recited in claim 30 comprising a motion detection capability coupled to said frame assembly.

32. An assembly as recited in claim 31 wherein said motion detection capability is selected from a group consisting of camera assemblies, microphone assemblies, ultrasonic transducers, magnetic position sensors, and RFID sensors.

* * * * *